US011834304B2

(12) United States Patent
Roni-Damond et al.

(10) Patent No.: US 11,834,304 B2
(45) Date of Patent: Dec. 5, 2023

(54) LIFTING AND HANDLING DEVICE EQUIPPED WITH IDENTIFICATION COMPONENTS TO ESTABLISH A CONFIGURATION AND AN OPERATING CHARACTERISTIC

(71) Applicant: MANITOWOC CRANE GROUP FRANCE, Dardilly (FR)

(72) Inventors: Bruno Roni-Damond, Lyons (FR); Simon Bucas, Lyons (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 174 days.

(21) Appl. No.: 17/553,771

(22) Filed: Dec. 16, 2021

(65) Prior Publication Data

US 2022/0185636 A1 Jun. 16, 2022

(30) Foreign Application Priority Data

Dec. 16, 2020 (FR) ..................... 20/13329

(51) Int. Cl.
*B66C 13/18* (2006.01)
*B66C 23/28* (2006.01)
(Continued)

(52) U.S. Cl.
CPC ............ *B66C 13/18* (2013.01); *B66C 23/283* (2013.01); *B66C 23/34* (2013.01); *B66C 23/88* (2013.01); *H04L 47/17* (2013.01)

(58) Field of Classification Search
CPC ....... H04L 47/17; B66C 13/18; B66C 23/283; B66C 23/34; B66C 23/88; B66C 23/905
See application file for complete search history.

(56) References Cited

U.S. PATENT DOCUMENTS 11,142,435 B2 * 10/2021 Hofmeister ............ G06Q 50/08
2010/0039262 A1 * 2/2010 Cameron ............... B66F 9/0755
340/568.1
(Continued)

FOREIGN PATENT DOCUMENTS

DE 102012025111 A1 6/2014
DE 102015016856 A1 6/2017
(Continued)

OTHER PUBLICATIONS

Search Report issued in connection with FR Pat. Appl. 20/13329, dated Sep. 1, 2021.

*Primary Examiner* — Michael R Mansen
*Assistant Examiner* — Juan J Campos, Jr.
(74) *Attorney, Agent, or Firm* — Cook Alex Ltd.

(57) ABSTRACT

A lifting and handling device includes a plurality of structural elements, a plurality of operating elements, at least one ballasting element mounted on a structural element, a central monitoring unit, and a plurality of identification components. Each structural, operating and ballasting element is coupled to an identification component, and each identification component includes a radiocommunication module having a radiocommunication range predefined in order to be able to communicate at least with one other identification component. A radiocommunication master unit is connected to the plurality of identification components and intended to receive identification information from each of the components. A method for monitoring an operation of the lifting and handling device is also provided.

25 Claims, 4 Drawing Sheets

(51) Int. Cl.
   *B66C 23/34*      (2006.01)
   *B66C 23/88*      (2006.01)
   *H04L 47/17*      (2022.01)

(56) References Cited

U.S. PATENT DOCUMENTS

| | | | | |
|---|---|---|---|---|
| 2010/0039317 A1* | 2/2010 | Cameron | ............... | G06Q 10/08 |
| | | | | 342/357.62 |
| 2010/0039319 A1* | 2/2010 | Cameron | ............... | B66C 13/16 |
| | | | | 342/357.29 |
| 2010/0044332 A1* | 2/2010 | Cameron | ............. | B66C 15/065 |
| | | | | 212/278 |
| 2016/0223313 A1 | 8/2016 | Reiner | | |
| 2019/0077639 A1* | 3/2019 | Hofmeister | ......... | G06F 16/9535 |
| 2019/0106302 A1* | 4/2019 | Krupinski | ............... | B66C 13/46 |

FOREIGN PATENT DOCUMENTS

| | | |
|---|---|---|
| DE | 102019104864 A1 | 8/2020 |
| EP | 1724230 A2 | 11/2006 |
| WO | 2021028258 A1 | 2/2021 |

* cited by examiner

LIFTING AND HANDLING DEVICE EQUIPPED WITH IDENTIFICATION COMPONENTS TO ESTABLISH A CONFIGURATION AND AN OPERATING CHARACTERISTIC

FIELD

The present disclosure concerns a lifting and handling device, such as for example a crane, comprising assembled structural elements and operating elements as well as identification components for identifying said structural and operating elements. The present disclosure further concerns a monitoring method for monitoring an operation of the aforementioned lifting and handling device.

BACKGROUND

Some lifting and handling devices such as construction cranes, and in particular block-erecting cranes (also called top slewing cranes) and self-erecting cranes, are composed of independent structural elements, also called frame elements, which are assembled to form a structure or a frame, and in particular to form a jib (made up of several jib elements), a counter-jib, a pivot, a mast also called a pylon (made up of several mast elements), and a base on which the mast is mounted. These structural elements can be assembled in a variable configuration for each construction site. Moreover, it is conventional for certain structural elements to be able to be used on several cranes, sometimes of different models, such as structural mast elements. Generally, each structural element is identified by a unique physical marking of its own, which may for example indicate the place and the date of manufacture of the structural element.

During a logistics supply, a park manager prepares and sends the appropriate structural elements to a construction site.

Once these structural elements are received on the construction site, a mounter must ensure that the mounts a structural element of the correct type at a suitable location on the crane to achieve a predefined crane configuration. It should also be noted that the crane also includes:
 - operating elements to provide movements of the lifting and handling device or a load, such as actuators such as for example a lifting winch, a distribution winch, a luffing winch, and drive elements such as for example a distribution trolley for a load distribution, a system of lifting block for lifting loads; and
 - ballasting elements, also called ballasts or counterweights, generally provided at the level of the base and/or on a counter-jib.

Such operating elements and such ballasting elements are thus mounted on structural elements, and participate in the lifting capacities and limits of the lifting and handling device.

Once the lifting and handling device has been mounted, a mounter or technician subsequently selects a load curve suited to a configuration of the predefined lifting and handling device; it being noted that this load curve will depend on the configuration of the lifting and handling device and more specifically on the structural elements (types, numbers, presence of reinforcements or not, and locations of the structural elements) which define the rigidity and the dimensions of the structure, such as the height of the mast, the length of the jib and the length of the counter-jib, and also of the operating elements (types, numbers and locations of the actuators and the driving elements) and of the ballasting elements (locations, weight, numbers).

Then, an assembly error could lead to an actual configuration different from the predefined configuration, and therefore to a selection of a load curve unsuitable for the actual configuration, with potentially serious consequences, such as damage or even collapse of the lifting and handling device.

A monitoring of the mounting of the lifting and handling device is therefore usually carried out visually. This monitoring is generally long, tedious and can be subject to human error.

The state of the art can be illustrated by the teachings of document US2016223313A which describes a machine provided with a movable arm such as a crane, comprising several articulated segments, whose some are provided with transmitter/receiver modules in communication with an evaluation module to evaluate the positions of the articulated segments, and thus make it possible to know the movements, vibrations and/or deflections of the movable arm.

However, this state of the art does not in any way propose a solution making it possible to facilitate the assembly of a lifting and handling device, and above all to know a configuration of this lifting and handling device, and therefore to adapt an operating characteristic to the configuration, and in particular a load curve; the notion of operating characteristic designating a characteristic representative of the control of the operating element(s), which, as a reminder, ensure the movements of the lifting and handling device and thus the movements of the load, and in particular control limits such as load limits defined by the aforementioned load curve.

The state of the art can also be illustrated by the teachings of document DE 10 2015 016856 A1 which discloses a method for configuring a crane on the basis of an online portal which contains at least one database comprising a plurality of standard crane configurations, with an interface for user access to the online portal. This method uses in particular a detection of certain structural elements to determine the configuration. Such a configuration method makes it possible to recover a load curve from the portal, however this is not optimal for the actual configuration of the crane, and moreover this method is unsuitable for responding to variable or even extreme configurations with long jibs or high masts.

The object of the present disclosure is to resolve all or part of the drawbacks mentioned above.

The technical problem underlying the present embodiments consists in particular in providing a lifting and handling device, such as a crane for example, making it possible to know a configuration of said lifting and handling device and to precisely adapt an operating characteristic to the configuration of said lifting and handling device, as well as a method for monitoring the operation of said lifting and handling device.

SUMMARY

To this end, the present disclosure relates to a lifting and handling device comprising a plurality of structural elements assembled to form a structure of said lifting and handling device, a plurality of operating elements carried by structural elements comprised in the plurality of structural elements and designed to provide movements of the lifting and handling device or of a load, at least one ballasting element mounted on a structural element, a central monitoring unit controlling at least one operating element comprised in the plurality of operating elements, said lifting and handling device being remarkable in that it further comprises:

a plurality of identification components, each structural element comprised in the plurality of structural elements being coupled to an identification component comprised in the plurality of identification components, each operating element comprised in the plurality of operating elements being coupled to an identification component comprised in the plurality of identification components, and the at least one ballasting element being coupled to an identification component comprised in the plurality of identification components, and each identification component comprising a radiocommunication module having a predefined radiocommunication range in order to be able to communicate at least with one other identification component, and a master radiocommunication unit connected to the plurality of identification components and intended to receive identification information from each of the identification components comprised in the plurality of identification components; each of the identification components being shaped to transmit to the radiocommunication master unit, the identification information according to a hop-by-hop communication protocol between identification components located within their radiocommunication ranges;

each of the identification components being configured to transmit to the radiocommunication master unit the identification information according to a hop-by-hop communication protocol between identification components located within their radiocommunication ranges;

and in that said central monitoring unit is linked with the radiocommunication master unit and is configured to determine a location of each structural element comprised in the plurality of structural elements, of each operating element comprised in the plurality of operating elements, and of at least one ballasting element according to the identification information transmitted by each of the identification components to the radiocommunication master unit, and deduce therefrom a configuration of the lifting and handling device then at least one typical operating characteristic of said lifting and handling device associated with said configuration.

Thus, the present embodiments make it possible to ascend the identification information of all the identification components, associated with the structural elements, the operating elements and the ballast element(s), by a hop-by-hop communication up to the radiocommunication master unit, and therefore to the central monitoring unit.

This hop-by-hop communication between the identification components advantageously makes it possible to ascend the identification information up to the radiocommunication master unit, even with a reduced radiocommunication range, as long as it is sufficient to communicate with a neighbor identification component. Such a solution is particularly advantageous in the field of block-erecting cranes (also called top slewing cranes), since such cranes may have higher or lower masts and longer or shorter jibs depending on the mounting configuration chosen, so that regardless of the distance from the furthest identification component from the master radiocommunication unit, the latter can always send up its identification information thanks to the hop-by-hop communication protocol implemented by the identification components.

Furthermore, the present embodiments make it possible to deduce a typical operating characteristic from the identification information of all the identification components, associated with the structural elements, with the operating elements and with the ballast element(s), This has the advantage of optimizing this typical operating characteristic by taking into account not only the structural elements, but also taking into account the operating elements and the ballast element(s) which contribute to the movement capacities of the lifting and handling device and of the load.

According to one possibility, the identification information communicated by the identification component of each structural element of the plurality of structural elements, contains a structural parameter which is representative of a maximum value of admissible stresses for said structural element, and wherein the central monitoring unit is configured to establish the typical operating characteristic also according to the structural parameter associated with each structural element of the plurality of structural elements.

This structural parameter may be a parameter which is representative of a stiffness of the structural element concerned. In other words, the identification information communicated by the identification component of each structural element of the plurality of structural elements, may contain a structural parameter representative of a stiffness of said structural element. This structural parameter representative of the stiffness (or rigidity) of said element can for example provide information on whether said structural element is reinforced or not.

According to another possibility, the identification information communicated by the identification component of each operating element of the plurality of operating elements, contains a limit operating parameter which is representative of a maximum value of admissible stresses for said operating element, and wherein the central monitoring unit is configured to establish the typical operating characteristic also according to the limit operating parameter associated with each operating element of the plurality of operating elements.

This limit operating parameter may be a parameter representative of a maximum admissible load for a movement associated to the operating element concerned; such as, for example, a maximum load for an actuator such as a winch or a cylinder.

According to another possibility, the identification information communicated by the identification component of the at least one ballasting element, contains a limit ballasting parameter which is representative of a maximum value of admissible stresses for said at least one ballasting element, and wherein the central monitoring unit is configured to establish the typical operating characteristic also according to the limit ballasting parameter associated with the at least one ballasting element.

This limit ballasting parameter may be a parameter which is representative of a mass or a weight of the ballasting element concerned Consideration of the structural parameters and/or the limit operating parameters and/or the limit ballast parameter(s) is particularly advantageous in establishing and optimizing the typical operating characteristic, taking into consideration not only the elements but also their maximum values of admissible stress; these admissible stresses being for example determined for cases of static loads, cases of dynamic loads and fatigue.

The identification component can for example designate an active battery-powered identification tag.

The lifting and handling device may refer to a crane, and for example a block-erecting tower crane (or top slewing crane) or a self-erecting crane, and may further have one or more of the following characteristics, considered alone or in combination.

According to one possibility, the plurality of structural elements are selected from the list comprising mast elements, jib elements, counter-jib elements, a pivot (rotating part at the top of the mast), a telescoping cage, anchoring frames, a hoisting structure, or a base (bearing part at the foot of the mast).

The telescoping cage is a structural element placed under the pivot (or under the rotating part) and which is used to add or remove mast elements. Such a telescoping cage generally comprises a linear actuator, such as a cylinder, which makes it possible to lift the rotating part and to provide a free space to position a new mast element.

The anchor frames are frames fixed along the mast and which are designed to be fixed to a neighboring structure by rigid links, depending on the final height to be reached, in order to transmit to the structure, the forces generated by the large mast height.

A hoisting structure, with its possible support frames, is a structural element placed at the foot of the mast and which serves to push the entire mast upwards.

The plurality of operating elements can be selected from the list comprising actuators and drive elements, which participate in the displacement of the load (for example in lifting and in distribution) and/or in the displacement of one or more structural elements (for example jib orientation and jib lowering/raising).

The actuators may comprise at least one lifting winch and one distribution winch, and the drive elements comprise at least one distribution trolley and one lifting block system.

Other actuators are also conceivable, such as a luffing winch or a luffing cylinder for a lowering/raising of the jib, a telescoping cylinder (coupled with a telescoping cage), a hoisting cylinder (coupled with a hoisting structure), or a jib orientation motor.

According to one possibility, the at least one typical operating characteristic designates a quantity or a curve representative of the load limits of the lifting and handling device, such as for example a load curve or a total mass to be lifted in the case of telescoping or hoisting; a load curve defining the maximum operating loads at the considered ranges.

Each identification component can comprise a monitoring device connected to a memory containing the identification information making it possible to identify the structural element or the operating element or the associated ballasting element, to an electric battery intended for supplying power to the monitoring device, and to a radiocommunication module intended to ensure communication between the identification components.

According to one embodiment, the communication between the identification components is short or medium distance and is done by Bluetooth, radio frequency or WIFI.

The radiocommunication range of the radiocommunication module of each identification component may be less than or equal to 30 m.

Advantageously, the fact that each radiocommunication module of each identification component has a radiocommunication range less than or equal to 30 m, and preferably between 15 m and 20 m, allows each identification component to receive a signal from radiocommunication containing the identification information, associated for example with a Received Signal Strength Indication (RSSI), coming from one or more neighboring identification components as well as the formation of a mesh network allowing the extraction by the central monitoring unit for the location of each of the construction elements, of each of the operating elements and of each of the ballasting elements in order to know a configuration of the lifting and handling device.

Advantageously, the fact that each radiocommunication module of each identification component has a radiocommunication range less than or equal to 30 m, and preferably between 15 m and 20 m, allows the identification component to be located by triangulation.

According to one embodiment, the central monitoring unit is configured to determine a location of each structural element comprised in the plurality of structural elements, of each operating element comprised in the plurality of operating elements and of the of at least one ballasting element as a function of a signal power, a signal attenuation, or a response time of the identification information transmitted by each of the identification components.

The central monitoring unit can be configured to select the at least one typical operating characteristic from among a plurality of typical operating characteristics stored in a computer database listing a plurality of configurations of the lifting and handling device with which respective typical operating characteristics are associated.

The present disclosure also concerns a monitoring method for monitoring the operation of a lifting and handling device as described above, this monitoring method comprising the following steps of:

an attaching step comprising attaching an identification component on each of the structural elements comprised in a plurality of structural elements, on each of the operating elements comprised in a plurality of operating elements and on at least one ballasting element;

a first transmitting step comprising transmitting, by the identification component attached to each of the structural elements, to each of the operating elements and to the at least one ballasting element, an identification information to at least one other identification component comprised in a radiocommunication range;

a receiving step comprising receiving, by a radiocommunication master unit connected to the plurality of the identification components, the identification information from each of the identification components comprised in the plurality of identification components, the identification information of the identification components being transmitted to the radiocommunication master unit according to a hop-by-hop communication protocol between identification components located within their radiocommunication ranges;

a second transmitting step comprising transmitting the identification information of each of the identification components by the radiocommunication master unit to a central monitoring unit, said central monitoring unit controlling at least one operating element comprised in the plurality of operating elements, and communicating with the master radiocommunication unit;

a determining step comprising determining, by the central monitoring unit, of a location of each structural element comprised in the plurality of structural elements, of each operating element comprised in the plurality of operating elements, and of the at least one ballasting element, as a function of the identification information transmitted by each of the identification components to the master radiocommunication unit;

a first deducing step comprising deducing a configuration of the lifting and handling device as a function of the location of each structural element comprised in the plurality of structural elements, of the location of each operating element comprised in the plurality of operating elements, of the location of the at least one ballasting element and of the identification information of each of the identification components; and a second deducing step comprising deducing, by the central monitoring unit, at least one typical operating characteristic of the lifting and handling device adapted to the configuration of the lifting and handling device.

The configuration of the lifting and handling device can designate a set of properties relating to the lifting and handling device, including a composition of the mast (number of structural elements of the mast, rigidity or reinforcement of structural elements of the mast, height of the mast deduced from the number and type of structural elements of the mast, location of the various structural elements of the mast), a nature of the base (swivel or fixed base, support of the base on the ground), a quantity and a location of the elements weight (number of ballasting elements at the base, number of ballasting elements at the counter-jib), a composition of the jib (number of structural jib elements, rigidity or reinforcement of the structural elements jib, length of the jib deduced from the number and type of jib structural elements, location of the various jib structural elements), a nature of the counter-jib (dimensions and rigidity of the counter-jib), a nature of the distribution trolley (model and distribution capacity of the distribution trolley), a nature of the lifting block system (model and lifting capacity of the lifting block system), a nature of the actuators (capacity of the winches, such as the lifting winch and the distribution winch, or also the luffing winch for jib lowering/raising).

According to one possibility, the identification information communicated by the identification component of each structural element of the plurality of structural elements, contains a structural parameter which is representative of a maximum value of admissible stresses for said structural element, and wherein the central monitoring unit establishes the typical operating characteristic also according to the structural parameter associated with each structural element of the plurality of structural elements.

According to another possibility, the identification information communicated by the identification component of each operating element of the plurality of operating elements, contains a limit operating parameter which is representative of a maximum value of admissible stresses for said operating element, and wherein the central monitoring unit establishes the typical operating characteristic also according to the limit operating parameter associated with each operating element of the plurality of operating elements According to another possibility, the identification information communicated by the identification component of the at least one ballasting element, contains a limit ballasting parameter which is representative of a maximum value of admissible stresses for said at least one ballasting element, and wherein the central monitoring unit establishes the typical operating characteristic also according to the limit ballasting parameter associated with the at least one ballasting element.

The second deducing step further comprises a selection of at least one typical operating characteristic from among a plurality of typical operating characteristics stored in a computer database listing a plurality of configurations of the lifting and handling device with associated typical operating characteristics.

In the method described, if the configuration of the lifting and handling device deduced during the first deducing step does not appear in the computer database, then the central monitoring unit emits a warning signal and blocks the lifting and handling device from being put into service.

According to a first embodiment, the step of deducing the at least one typical operating characteristic consists in deducing a single typical operating characteristic adapted to the configuration of the lifting and handling device.

In this embodiment, the described method may comprise a selecting step comprising automatically selecting, by the central monitoring unit, the typical operating characteristic to induce a limitation of a control of the lifting and handling device by a pilot.

According to a second embodiment of the described method, the second deducing step consists in deducing at least two typical operating characteristics adapted to the configuration of the lifting and handling device, said monitoring method further comprising the following steps of:

a displaying step comprising displaying for a pilot, in charge of monitoring the lifting and handling device, of at least two typical operating characteristics;

a selecting step comprising selecting by the pilot of a preferred typical operating characteristic among the at least two typical operating characteristics;

a selecting step comprising selecting by the central monitoring unit of the preferred typical operating characteristic to induce a limitation of the control of the lifting and handling device by the pilot.

BRIEF DESCRIPTION OF THE DRAWINGS

The invention will be better understood with the aid of the detailed description which is exposed below with reference to the accompanying drawings in which.

DESCRIPTION

In the following detailed description of the figures defined above, the same elements or elements fulfilling identical functions may retain the same references so as to simplify the understanding of the invention.

Composition of the Lifting and Handling Device

Figure 1:
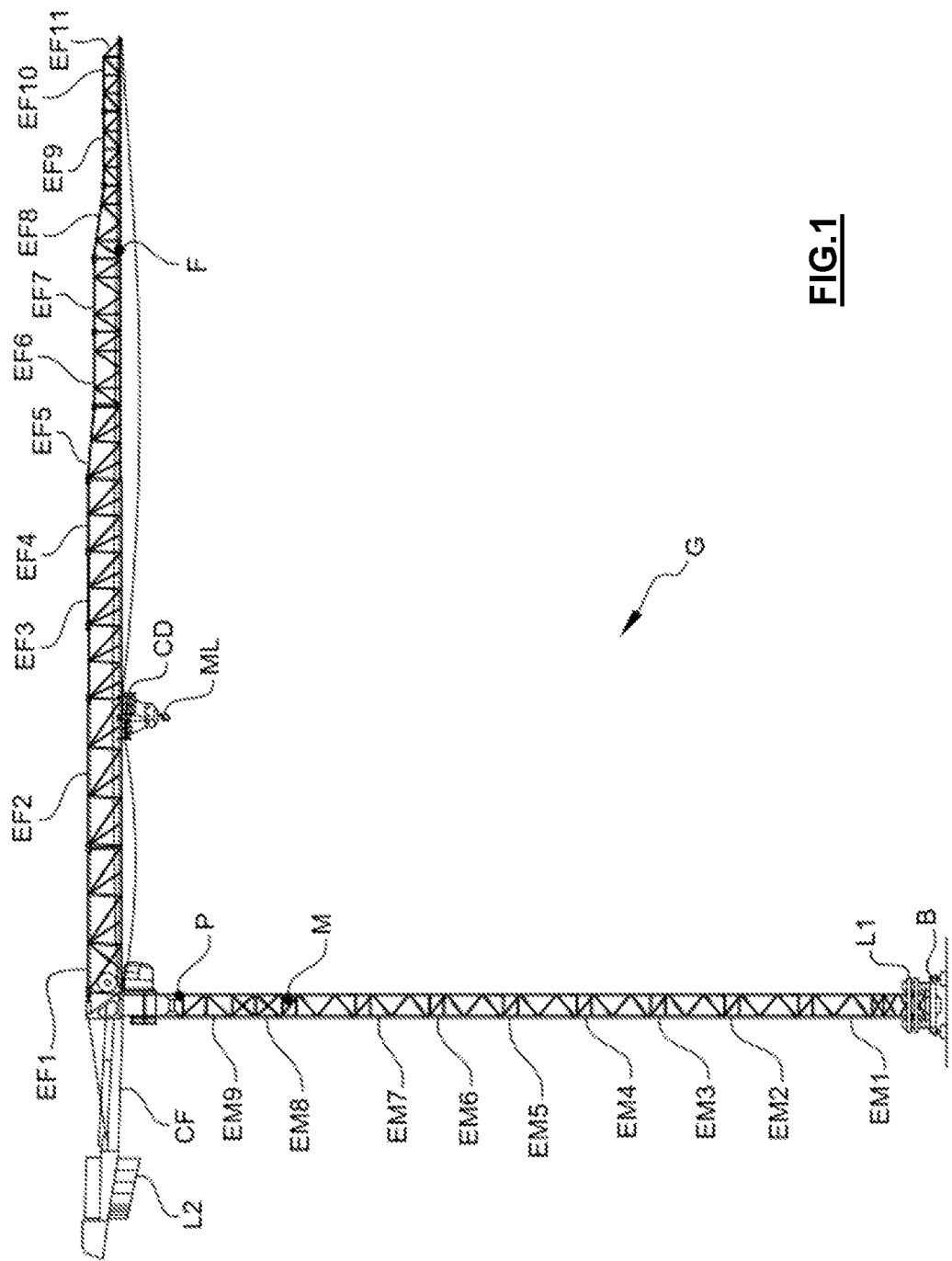
FIG. 1 is a schematic representation of a lifting and handling device comprising structural, operating and ballasting elements.

The present disclosure concerns a lifting and handling device G which designates a crane represented in FIG. 1, and for example a block-erecting tower crane or an self-erecting tower crane, comprising a plurality of structural elements EMi, EFj, B, P, CF assembled to form a structure of said lifting and handling device.

In the example illustrated in FIG. 1, the lifting and handling device G comprises the following structural elements:
- mast elements EMi (here EM1, EM2, EM3, EM4, ... EM9) which, once assembled, form a vertical extension mast M;
- a base B on which the foot of the mast M is fixed, said base B generally resting on the ground;
- a pivot P fixed to the top of the mast M and movable in rotation about a vertical axis;
- jib elements EFj (here EF1, EF2, EF3, EF4, ... EF11) which, once assembled on the pivot P, forms an arrow F of horizontal extension; and
- a counter-jib CF assembled on the pivot P, opposite the jib F.

The lifting and handling device G also comprises a plurality of operating elements carried by structural elements comprised in the plurality of structural elements EMi, EFj, B, P, CF and designed to provide movements of the lifting and handling device G or of a load. The operating elements can be selected from the list comprising actuators and drive elements.

In the example illustrated in FIG. 1, the driving elements comprise at least one distribution trolley CD movable along the arrow F for a distribution of a load, and a lifting block system ML suspended from the distribution trolley CD for lifting the load. Also, the actuators may comprise at least one distribution winch (not illustrated) which actuates the displacement of the distribution trolley CD via a distribution cable, and a lifting winch (not illustrated) which actuates the displacement of the lifting block system ML via a lifting cable. These actuators can also comprise an orientation motor (not illustrated) mounted on the pivot P to actuate the rotation of the rotating part composed of the pivot P, the jib F and the counter-jib CF.

The lifting and handling device G also comprises at least one ballasting element L1, L2 mounted on a structural element.

In the example illustrated in FIG. 1, the ballasting elements comprise one or more weights L1 mounted on the base B, and also one or more weights L2 mounted on the counter-jib CF.

The lifting and handling device G comprises a central monitoring unit UC (illustrated in FIG. 3) controlling at least one operating element comprised in the plurality of operating elements. In this case, this central monitoring unit UC controls the actuators, such as the aforementioned distribution winch, lifting winch and orientation motor.

Figure 2:
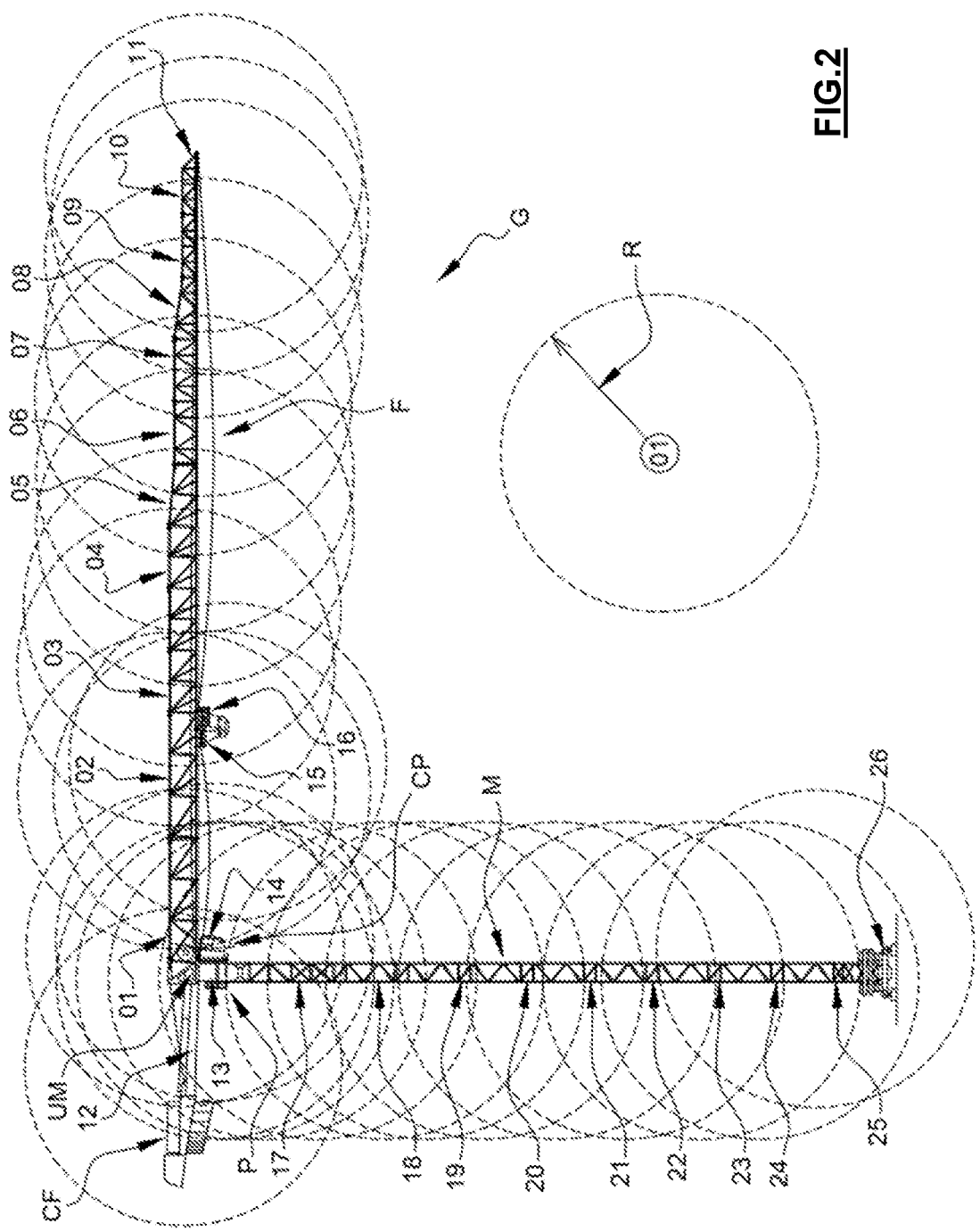
FIG. 2 is a schematic representation of the lifting and handling device of FIG. 1 comprising a plurality of identification components.

Referring to FIG. 2, said lifting and handling device G further comprises a plurality of identification components 01-26, each structural element comprised in the plurality of structural elements EMi, EFj, B, P, CF being coupled to an identification component comprised in the plurality of identification components 01-26, each operational element comprised in the plurality of operational elements being coupled to an identification component comprised in the plurality of identification components 01-26, and the at least one weight element L1, L2 being coupled to an identification component comprised in the plurality of identification components 01-26.

In the example illustrated in FIG. 2, the identification components 01-11 are mounted on eleven jib elements EF1, ... , EF11 forming the jib F, the identification component 12 is mounted on the counter-jib CF, the identification component 13 is mounted on the pivot P, the identification component 14 is mounted on a pilot cabin CP carried by the pivot P, the identification component 15 is mounted on the distribution trolley CD, the identification component 16 is mounted on the lifting block system ML, the identification components 17-25 are mounted on nine mast elements EM1, ... , EM9 forming the mast M, and the identification component 26 is mounted on the base B. Also, in this FIG. 2, all the identification components are not represented, missing those associated with the actuators and those associated with the ballasting elements L1, L2.

Each identification component 01-26 comprising a radiocommunication module having a predefined radiocommunication range R in order to be able to communicate with at least one other identification component.

The lifting and handling device G comprises a master radiocommunication unit UM connected to the plurality of identification components 01-26 and intended to receive identification information from each of the identification components comprised in the plurality of identification components 01-26. This master radiocommunication unit UM is also connected to the central monitoring unit UC, for example by wired or wireless way.

Identification Components

Figure 6:
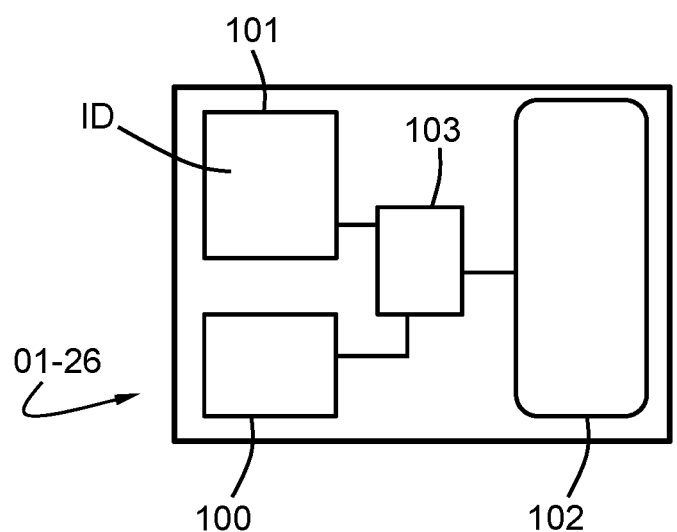
FIG. 6 is a schematic representation of an identification component.

Referring to FIG. 6, in the lifting and handling device G, each identification component 01-26 comprises:
- the radiocommunication module 100 having the predefined radiocommunication range R (illustrated in FIG. 2) in order to be able to communicate at least with one other identification component, said radiocommunication module forming a transmitter/receiver;
- a memory 101 storing identification information ID making it possible to individually identify the associated element, whether it is a structural element, an operating element or a ballasting element;
- an electric battery 102; and
- a monitoring device 103, for example of the processor or monitoring type, connected to the memory 101, to the electric battery 102 and to the radiocommunication module 100 to allow the identification component to send its identification information ID to one or more neighboring identification components, and also to receive from one or more neighboring identification components their respective identification information ID in order to forward to the other neighboring identification components this or these identification information IS that it would have received from one or more neighboring identification components.

In this way, the identification components 01-26 form a «mesh» network or with autonomous identification components 01-26 that communicate step by step using a decentralized radio protocol. The term «Neighboring identification component» means an identification component located within the radiocommunication range R.

Figure 3:
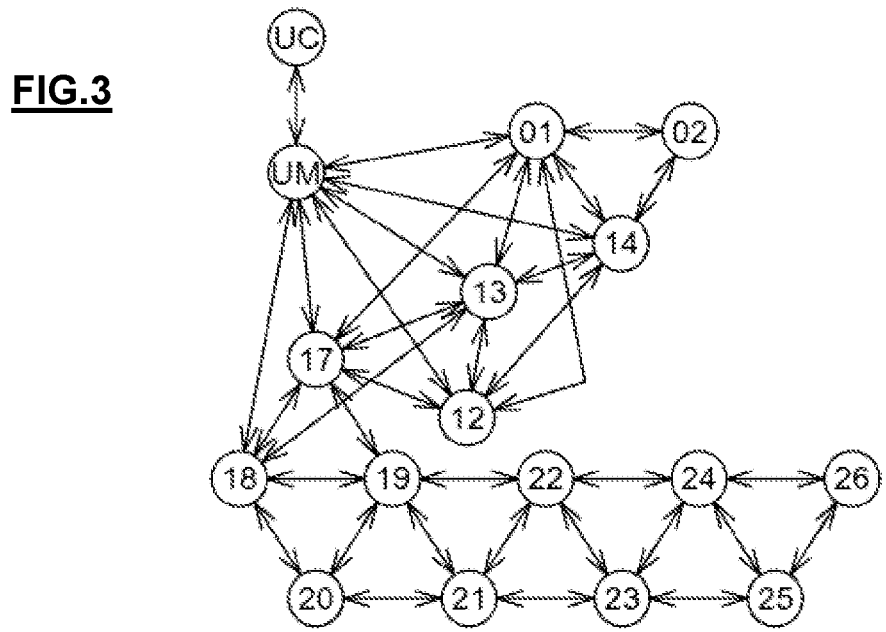
FIG. 3 is a diagram representing a hop-by-hop communication between the identification components of FIG. 2 and a radiocommunication master unit connected to a central monitoring unit.

In the mesh network formed by the identification components 01-26, the master radiocommunication unit UM is connected:
- either directly to the identification components which are adjacent to it, as for example, the identification components 01, 12, 13, 14, 17 and 18 in the example of FIGS. 1 and 3;
- or indirectly to the identification components which are not neighboring to it, via hop-by-hop communication which passes through one of the neighboring identification components.

In other words, each of the identification components 01-26 is shaped to transmit to the master radiocommunication unit UM the identification information according to a hop-by-hop communication protocol between identification components located within their radiocommunication ranges R. The term «hop-by-hop communication» means successive wireless transmission of a radiocommunication signal between identification components located within their radiocommunication ranges R until the radiocommunication signal reaches the master radiocommunication unit UM as shown in FIG. 3.

According to one embodiment, the radiocommunication module of each of the identification components 01-26 is a short or medium range radiocommunication module, that is to say with a range R less than or equal to 30 meters, or even less than or equal to 20 meters. This radiocommunication module is for example a radiocommunication module by Bluetooth, radio frequency or WIFI.

For each identification component 01-26, the identification information also contains a limit parameter which is representative of a maximum value of admissible stresses for the element concerned, namely:
  for each structural element, a structural parameter which is representative of a maximum value of admissible stresses for said structural element;
  for each operating element, a limit operating parameter which is representative of a maximum value of admissible stresses for said operating element; and
  for the or each ballast element, a limit ballasting parameter which is representative of a maximum value of admissible stresses for said ballast element.

As an example, the identification information communicated by the identification component of each structural element of the plurality of structural elements, may contain the structural parameter representative of a stiffness of said structural element.

This structural parameter representative of the stiffness (or rigidity) of said element can for example provide information on whether said element is reinforced or not.

The central monitoring unit UC is configured to establish the typical operating characteristic also as a function of the structural parameter associated with each structural element of the plurality of structural elements, of the limit operating parameter associated with each operating element of the plurality of operating elements, and of the limit ballast parameter associated with the or each ballast element.

Advantageously, the formation of the mesh network with autonomous identification components 01-26 which communicate hop-by-hop according to a decentralized radio protocol, each identification component 01-26 transmitting to at least one neighboring identification component a signal of radiocommunication containing identification information enables the central monitoring unit UC to:
  retrieve, via the master radiocommunication unit UM, all of the radiocommunication signals containing the identification information of the various identification components 01-26; and
  calculate or deduce a location for each of the identification components 01-26 in the lifting and handling device G from these signals;
  deduce a location for each of the structural elements, each of the operating elements and each of the ballasting elements which are associated with the different identification components 01-26, from the identification information contained in their radiocommunication signals;
  construct or deduce a configuration of the lifting and handling device G as a function of the location of these structural elements, operating elements and ballasting elements.

Advantageously, the central monitoring unit UC operates the location of each of the identification components 01-26 at least in part by triangulation, by determining who is or are the neighbor or neighbors of each of the identification components 01-26.

As a variant or in addition to this location by triangulation, the central monitoring unit UC can determine the location of each of the identification components 01-26 as a function of a power of the radiocommunication signal received by the identification components, an attenuation of the radiocommunication signal received by the identification components or a response time of the identification information transmitted by each of the identification components. Indeed, each of these signal parameters (received power or RSSI, attenuation or response time) is a function of the distance between the two identification components which communicate with each other.

The Table [Table 1] represents an example of a sequence of information relating to a mast M of the lifting and handling device G transmitted from the master radiocommunication unit UM to the central monitoring unit UC. The central monitoring unit UC measures a distance between the master radiocommunication unit UM and each mast element EMi of the mast M, with which the identification information is associated so that the central monitoring unit UC can deduce a composition of the mast M.

TABLE 1

| Identification component | Distance to the master radiocommunication unit UM | Identification information |
| --- | --- | --- |
| 17 | 4.5 m | Mast element EM9 Type 1 |
| 18 | 9.4 m | Mast element EM8 type 1 |
| 19 | 14.3 m | Mast element EM7 type 1 |
| ... | ... | ... |
| 25 | 43.7 m | Reinforced mast element EM1 type 1 |
| 26 | 49.0 m | Base B type XX |

The central monitoring unit UC can apply a consistency monitoring between the measured distances and theoretical distances stored in said central monitoring unit UC. The central monitoring unit UC is thus able to detect whether one or more mast elements are missing in the mast M and can therefore report it to an operator in charge of mounting the mast M.

Likewise, the central monitoring unit UC may be able to determine a composition of the deflection F, the nature of the counter-deflection CF or the nature of the distribution trolley CD, etc.

Determination of an Operating Characteristic

In the lifting and handling device G according to the present embodiments, the central monitoring unit UC is therefore linked to the master radiocommunication unit UM and is configured to determine a location of each structural element comprised in the plurality of structural elements, of each operating element comprised in the plurality of operating elements, and of each ballasting element L1, L2 as a function of the identification information (and more precisely of the radiocommunication signal containing the identification information) transmitted by each of the identification components 01-26 to the master radiocommunication unit UM, and deduce a configuration of the lifting and handling device G.

It is noted that the central monitoring unit UC can establish the typical operating characteristic also as a function of the structural parameter associated with each structural element of the plurality of structural elements, of the limit operating parameter associated with each operating element of the plurality of operating elements, and of the limit ballast parameter associated with the or each ballast element.

Once the central monitoring unit UC has established the configuration of the lifting and handling device G, this central monitoring unit UC determines at least one typical operating characteristic of the lifting and handling device G associated with said configuration.

The at least one typical operating characteristic designates a quantity or a curve representative of the load limits, for example a load curve. The load curve defines the maximum loads that can be lifted by the lifting and handling device G at the ranges considered along its arrow F, in particular also as a function of a conventional wind resistance used during a design of the lifting and handling device G.

According to one possibility, the central monitoring unit UC is configured to select the at least one typical operating characteristic from among a plurality of typical operating characteristics stored in a computer database listing a plurality of configurations of the lifting and handling device G with which respective typical operating characteristics are associated. The computer database relating to the lifting and handling device G can for example designate a local database of the central monitoring unit UC or else recorded on a dedicated server, and for example a dedicated remote server.

The at least one typical operating characteristic selected by the central monitoring unit UC can take into account local regulations or even a physical quantity relating to the wind, such as wind speed.

Method for Monitoring the Operation of the Lifting and Handling Device

Figure 4:
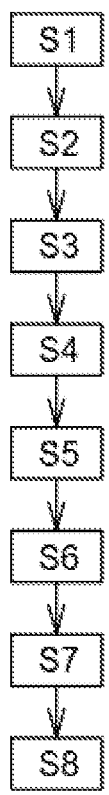
FIG. 4 is a flowchart showing the execution steps of a first embodiment of a method for monitoring the operation of the lifting and handling device of FIG. 2.
Figure 5:
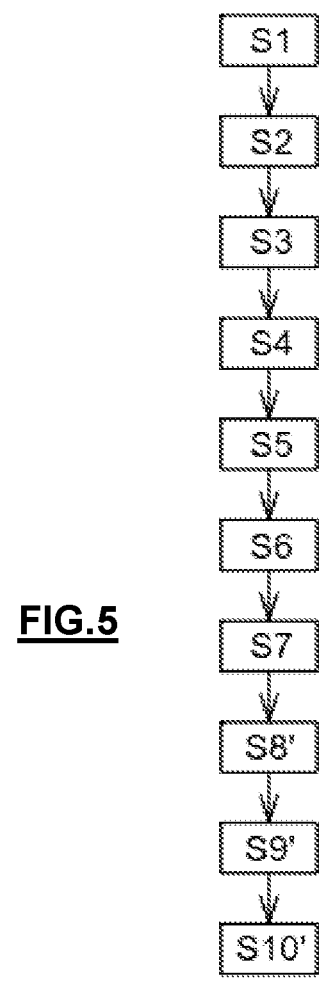
FIG. 5 is a flowchart showing the steps of performing a second embodiment of a method for monitoring the operation of the lifting and handling device of FIG. 1

The present disclosure also concerns a monitoring method for monitoring the operation of a lifting and handling device G comprising the following steps represented in FIGS. 4 and 5:

- an attaching step S1 consisting in attaching an identification component 01-26 on each of the structural elements comprised in a plurality of structural elements, on each of the operating elements comprised in a plurality of operating elements and on each of the ballasting elements;
- a first transmitting step S2 consisting in transmitting by the identification component 01-26 attached to each of the structural elements, each of the operating elements and each of the ballasting elements of an identification information to at least one other identification component comprised in the radiocommunication range R;
- a receiving step S3 consisting in receiving by the master radiocommunication unit UM connected to the plurality of identification components 01-26 of an identification information from each of the identification components comprised in the plurality of identification components 01-26, the identification information of the identification components being transmitted to the radiocommunication master unit UM according to a hop-by-hop communication protocol between identification components located within their radiocommunication ranges R;
- a second transmitting step S4 consisting in transmitting the identification information of each of the identification components 01-26 by the radiocommunication master unit UM to the central monitoring unit UC;
- a determining step S5 consisting in determining, by the central monitoring unit UC, a location of each structural element comprised in the plurality of structural elements, of each operating element comprised in the plurality of operating elements, and of each ballasting element, as a function of the identification information transmitted by each of the identification components to the master radiocommunication unit UM;
- a first deducing step S6 consisting in deducing the configuration of the lifting and handling device G as a function of the location of each structural element comprised in the plurality of structural elements, of the location of each operating element comprised in the plurality of operating elements, of the location of each ballasting element and of the identification information of each of the identification components 01-26;
- a second deducing step S7 consisting in deducing, by the central monitoring unit UC, at least one typical operating characteristic of the lifting and handling device G suitable for the configuration of the lifting and handling device G.

The second deducing step S7 comprises, as previously explained, a selection of at least one typical operating characteristic from among a plurality of typical operating characteristics stored in the computer database listing a plurality of typical operating characteristics of the lifting and handling device G with associated typical operating characteristics.

In the described method, if the configuration of the lifting and handling device G deduced during the first deducing step S6 does not appear in the computer database, then the central monitoring unit UC sends an alert signal and blocks a commissioning of the lifting and handling device G.

First Embodiment

According to a first embodiment, the second deducing step S7 consists in deducing a single typical operating characteristic adapted to the configuration of the lifting and handling device G. For example, in the data base, a single typical operating characteristic is associated with the configuration.

In this embodiment, the method described can comprise a selecting step S8 represented in FIG. 4 and which consists in automatically selecting, by the central monitoring unit UC, the typical operating characteristic in order to induce a limitation of a control of the lifting and handling device G by a pilot. In other words, the pilot of the lifting and handling device G, generally located in the cockpit CP, is limited in its control on the basis of this typical operating characteristic which, as a reminder, can advantageously be a load curve.

Second Embodiment

According to a second embodiment of the described method, the second deducing step S7 consists in deducing at least two typical operating characteristics suitable for the configuration of the lifting and handling device. For example, in the data base, two typical operating characteristics are associated with the configuration, for example a typical operating characteristic which will favor a lifting capacity at the end of the jib to the detriment of a maximum lifting capacity at the bottom of the jib, and another typical operating characteristic which will favor a lifting capacity at the bottom of the jib to the detriment of a maximum lifting capacity at the end of the jib.

In this second mode, the method further comprises the following steps represented in FIG. 5:

- a displaying step S8' consisting in displaying for the pilot, in charge of control the lifting and handling device G, of at least two typical operating characteristics;
- a selecting step S9' consisting in selecting by the pilot of a favorite typical operating characteristic among the at least two typical operating characteristics (for example according to the conditions on site, and in particular the wind conditions);

a selecting step S10' consisting in selecting by the central monitoring unit UC of the preferred typical operating characteristic to induce a limitation of the control of the lifting and handling device G by the pilot.

In other words, the pilot of the lifting and handling device G is limited in his control on the basis of this favorite typical operating characteristic which he has selected from among those adapted to the configuration.

Although the invention has been described in connection with particular embodiments, it is obvious that it is in no way limited thereto and that it comprises all the technical equivalents of the means described as well as their combinations if these come within the scope of the invention.

The invention claimed is:

1. A lifting and handling device comprising:
a plurality of structural elements assembled to form a structure of said lifting and handling device;
a plurality of operating elements carried by structural elements comprised in the plurality of structural elements and designed to provide movements of the lifting and handling device or a load;
at least one ballasting element mounted on a structural element;
a central monitoring unit controlling at least one operating element comprised in the plurality of operating elements;
wherein said lifting and handling device comprises:
a plurality of identification components, each structural element comprised in the plurality of structural elements being coupled to an identification component comprised in the plurality of components identification, each operating element comprised in the plurality of operating elements being coupled to an identification component comprised in the plurality of identification components, and the at least one ballasting element being coupled to an identification component comprised in the plurality of identification components, and each identification component comprising a radiocommunication module having a predefined radiocommunication range in order to be able to communicate with at least one other identification component; and
a radiocommunication master unit connected to the plurality of identification components and intended to receive identification information from each of the identification components comprised in the plurality of the identification components;
each of the identification components being configured to transmit to the radiocommunication master unit the identification information according to a hop-by-hop communication protocol between identification components located within their radiocommunication ranges;
and in that said central monitoring unit is linked to the master radiocommunication unit and is configured to:
determine a location of each structural element comprised in the plurality of structural elements, of each operating element comprised in the plurality of operating elements, and of at least one ballasting element as a function of the identification information transmitted by each of the identification components to the master radiocommunication unit, and
deduce therefrom a configuration of the lifting and handling device then at least one typical operating characteristic of said lifting and handling device associated with said configuration.

2. The lifting and handling device according to claim 1, wherein the identification information communicated by the identification component of each structural element of the plurality of structural elements, contains a structural parameter which is representative of a maximum value of admissible stresses for said structural element, and wherein the central monitoring unit is configured to establish the typical operating characteristic also according to the structural parameter associated with each structural element of the plurality of structural elements.

3. The lifting and handling device according to claim 2, wherein the structural parameter is a parameter which is representative of a stiffness of the structural element concerned.

4. The lifting and handling device according to claim 1, wherein the identification information communicated by the identification component of each operating element of the plurality of operating elements, contains a limit operating parameter which is representative of a maximum value of admissible stresses for said operating element, and wherein the central monitoring unit is configured to establish the typical operating characteristic also according to the limit operating parameter associated with each operating element of the plurality of operating elements.

5. The lifting and handling device according to claim 4, wherein the limit operating parameter is a parameter which is representative of a maximum admissible load for a movement associated to the operating element concerned.

6. The lifting and handling device according to claim 1, wherein the identification information communicated by the identification component of the at least one ballasting element, contains a limit ballasting parameter which is representative of a maximum value of admissible stresses for said at least one ballasting element, and wherein the central monitoring unit is configured to establish the typical operating characteristic also according to the limit ballasting parameter associated with the at least one ballasting element.

7. The lifting and handling device according to claim 6, wherein the limit ballasting parameter is a parameter which is representative of a mass or a weight of the ballasting element concerned.

8. The lifting and handling device according to claim 1, which designates a crane, for example a block-erecting tower crane or a self-erecting crane.

9. The lifting and handling device according to claim 1, wherein the plurality of structural elements are selected from the list comprising mast elements, jib elements, a counter-jib, a pivot, a telescoping cage, anchor frames, a hoisting structure, or a base.

10. The lifting and handling device according to claim 1, wherein the plurality of operating elements are selected from the list comprising actuators and drive elements.

11. The lifting and handling device according to claim 10, wherein the actuators comprise at least one lifting winch and one distribution winch, and the drive elements comprise at least one distribution trolley and a lifting block system.

12. The lifting and handling device according to claim 1, wherein the at least one typical operating characteristic is a quantity or a curve representative of the load limits of the lifting and handling device, such as for example a load curve.

13. The lifting and handling device according to claim 1, wherein each identification component comprises a monitoring device connected to a memory containing the identification information allowing to identify the structural element or the operating element or the ballasting element associated, to an electric battery intended to supply the monitoring device, and to a radiocommunication module intended to ensure communication between the identification components.

14. The lifting and handling device according to claim 1, wherein the radiocommunication range of the radiocommunication module of each identification component is less than or equal to 30 m.

15. The lifting and handling device according to claim 1, wherein the central monitoring unit is configured to determine a location of each structural element comprised in the plurality of structural elements, of each operating element comprised in the plurality of operating elements and of at least one ballasting element as a function of a power signal, a signal attenuation or a response time of the identification information transmitted by each of the identification components.

16. The lifting and handling device according to claim 1, wherein the central monitoring unit is configured to select the at least one typical operating characteristic from among a plurality of typical operating characteristics stored in a computer database listing a plurality of configurations of the lifting and handling device with which respective typical operating characteristics are associated.

17. A monitoring method for monitoring the operation of a lifting and handling device according to claim 1, said monitoring method comprising the following steps:
an attaching step comprising attaching an identification component on each of the structural elements comprised in a plurality of structural elements, on each of the operating elements comprised in a plurality of operating elements and on at least one ballasting element;
a first transmitting step comprising transmitting, by the identification component attached to each of the structural elements, to each of the operating elements and to the at least one ballasting element, an identification information to at least one other identification component comprised in a radiocommunication range;
a receiving step comprising receiving, by a radiocommunication master unit connected to the plurality of identification components, the identification information from each of the identification components comprised in the plurality of identification components, the identification information of the identification components being transmitted to the radiocommunication master unit according to a hop-by-hop communication protocol between identification components located within their radiocommunication ranges;
a second transmitting step comprising transmitting the identification information of each of the identification components by the radiocommunication master unit to a central monitoring unit, said central monitoring unit controlling at least one operating element comprised in the plurality of operating elements, and communicating with the radiocommunication master unit;
a determining step comprising determining, by the central monitoring unit, a location of each structural element comprised in the plurality of structural elements, of each operating element comprised in the plurality of operating elements, and of the at least one ballasting element, as a function of the identification information transmitted by each of the identification components to the radiocommunication master unit;
a first deducing step comprising deducing a configuration of the lifting and handling device as a function of the location of each structural element comprised in the plurality of structural elements, of the location of each operating element comprised in the plurality of operating elements, of the location of the at least one ballasting element and of the identification information of each of the components identification;
a second deducing step comprising deducing, by the central monitoring unit, at least one typical operating characteristic of the lifting and handling device suitable for the configuration of the lifting and handling device.

18. The monitoring method according to claim 17, wherein the identification information communicated by the identification component of each structural element of the plurality of structural elements, contains a structural parameter which is representative of a maximum value of admissible stresses for said structural element, and wherein the central monitoring unit establishes the typical operating characteristic also according to the structural parameter associated with each structural element of the plurality of structural elements.

19. The monitoring method according to claim 17, wherein the identification information communicated by the identification component of each operating element of the plurality of operating elements, contains a limit operating parameter which is representative of a maximum value of admissible stresses for said operating element, and wherein the central monitoring unit establishes the typical operating characteristic also according to the limit operating parameter associated with each operating element of the plurality of operating elements.

20. The monitoring method according to claim 17, wherein the identification information communicated by the identification component of the at least one ballasting element, contains a limit ballasting parameter which is representative of a maximum value of admissible stresses for said at least one ballasting element, and wherein the central monitoring unit establishes the typical operating characteristic also according to the limit ballasting parameter associated with the at least one ballasting element.

21. The monitoring method according to claim 17, wherein the second deducing step further comprises a selection of at least one typical operating characteristic from among a plurality of typical operating characteristics stored in a computer database listing a plurality of configurations of the lifting and handling device with which respective typical operating characteristics are associated.

22. The monitoring method according to claim 21, wherein, if the configuration of the lifting and handling device deduced during the first deducing step (S6) does not appear in the computer database, then the central monitoring unit emits a warning signal and blocks the commissioning of the lifting and handling device.

23. The monitoring method according to claim 17, wherein the second deducing step consists in deducing a single typical operating characteristic adapted to the configuration of the lifting and handling device.

24. The monitoring method according to claim 23, comprising a selecting step comprising automatically selecting, by the central monitoring unit, the typical operating characteristic to induce a limitation of a control of the lifting and handling device by a pilot.

25. The monitoring method according to claim 17, wherein the second deducing step consists in deducing at least two typical operating characteristics adapted to the configuration of the lifting and handling device, said monitoring method further comprising the following steps of:
- a displaying step comprising displaying for a pilot, in charge of control the lifting and handling device, of at least two typical operating characteristics;
- a selecting step comprising selecting by the pilot of a preferred typical operating characteristic among the at least two typical operating characteristics;
- a selecting step comprising selecting by the central monitoring unit of the preferred typical operating characteristic to induce a limitation of the control of the lifting and handling device by the pilot.

* * * * *